United States Patent [19]

Ushijima et al.

[11] Patent Number: 4,802,658
[45] Date of Patent: Feb. 7, 1989

[54] VIBRATION ISOLATING APPARATUS

[75] Inventors: Takao Ushijima, Chigasaki; Takeshi Noguchi, Yokohama, both of Japan

[73] Assignee: Bridgestone Corporation, Tokyo, Japan

[21] Appl. No.: 134,598

[22] Filed: Dec. 16, 1987

Related U.S. Application Data

[63] Continuation of Ser. No. 770,236, Aug. 28, 1985, abandoned.

[30] Foreign Application Priority Data

Sep. 7, 1984 [JP] Japan .................. 59-187360

[51] Int. Cl.$^4$ .................. F16F 15/04; B60G 15/04; F16M 13/00
[52] U.S. Cl. .................. 267/140.1; 248/562; 267/219
[58] Field of Search .................. 267/35, 140.1, 140.4, 267/141.2–141.7, 122, 123, 219, 220; 180/300, 312; 188/298, 378, 379; 248/562, 636, 638, 659; 123/192 R, 195 A

[56] References Cited

U.S. PATENT DOCUMENTS

| 1,114,284 | 10/1914 | Olsen | 267/35 |
|---|---|---|---|
| 1,800,434 | 4/1931 | Christman | 267/141.2 |
| 2,539,443 | 1/1951 | Lee | 267/140.1 |
| 2,540,130 | 2/1951 | Lee | 267/140.3 |
| 2,582,998 | 1/1952 | Lee | 267/140.1 |
| 3,159,388 | 12/1964 | Wall | 267/175 |
| 3,361,216 | 1/1968 | Walker | 188/298 |
| 4,383,679 | 5/1983 | Kakimoto | 267/140.1 |
| 4,511,126 | 4/1985 | Bernuchon et al. | 267/140.1 |
| 4,568,069 | 2/1986 | Poupard | 248/562 X |
| 4,588,174 | 5/1986 | Konishi | 267/140.1 |
| 4,605,207 | 8/1986 | Konishi | 267/140.1 |
| 4,630,808 | 12/1986 | Ushijima et al. | 267/140.1 |
| 4,660,812 | 4/1987 | Dan et al. | 267/140.1 |
| 4,687,188 | 8/1987 | Knurek et al. | 267/140.1 |

FOREIGN PATENT DOCUMENTS

| 0027751 | 4/1981 | European Pat. Off. | 267/140.1 |
|---|---|---|---|
| 0040290 | 11/1981 | European Pat. Off. | |
| 0088682 | 9/1983 | European Pat. Off. | |
| 0133588 | 2/1985 | European Pat. Off. | |
| 0147242 | 7/1985 | European Pat. Off. | |
| 3210731 | 10/1983 | Fed. Rep. of Germany | |
| 3340153 | 8/1984 | Fed. Rep. of Germany | |
| 3617787 | 11/1986 | Fed. Rep. of Germany | |
| 3519016 | 12/1986 | Fed. Rep. of Germany | |
| 0066539 | 6/1981 | Japan | 267/140.1 |
| 0076340 | 5/1982 | Japan | 267/140.1 |
| 0037337 | 3/1983 | Japan | 267/140.1 |
| 59-47541 | 3/1984 | Japan | |
| 59-65635 | 4/1984 | Japan | |
| 59-97334 | 6/1984 | Japan | 267/140.1 |
| 0113835 | 6/1985 | Japan | |
| 0184740 | 9/1985 | Japan | |
| 0201136 | 10/1985 | Japan | |
| 0045131 | 3/1986 | Japan | |
| 0578510 | 10/1977 | U.S.S.R. | |
| 2041485 | 9/1980 | United Kingdom | 267/140.1 |
| 2132312 | 7/1984 | United Kingdom | |

Primary Examiner—Andres Kashnikow
Assistant Examiner—Robert J. Oberleitner
Attorney, Agent, or Firm—Parkhurst, Oliff & Berridge

[57] ABSTRACT

A vibration isolating apparatus is interposed between a vibration generating portion and a vibration receiving portion. The apparatus includes a main body which has a portion thereof constituted by a resilient member. The main body is provided with a liquid chamber which is capable of being expanded and contracted. The liquid chamber is divided by a partition member into small liquid chambers which are communicated with each other through an orifice. The orifice is able to absorb low-frequency vibrations but unable to absorb high-frequency vibrations. For this reason, a resilient membrane is provided between the small liquid chambers in such a manner as to suppress the rise in pressure inside the small liquid chambers so that high-frequency vibrations are also absorbed. It is possible to enhance the high-frequency vibration absorbing effect by providing, together with the resilient membrane, an opening means having a cross-sectional opening area which is larger than that of the orifice but smaller than the effective cross-sectional opening area of the resilient membrane.

28 Claims, 7 Drawing Sheets

VIBRATION ISOLATING APPARATUS

This is a continuation of application Ser. No. 770,236 filed Aug. 28, 1985, now abandoned.

BACKGROUND OF THE INVENTION

1. Field of the Invention

The present invention relates to a vibration isolating apparatus which is interposed between a vibration generating portion and a vibration receiving portion so as to absorb and damp vibrations from the vibration generating portion.

2. Description of the Related Prior Art

One type of conventionally employed vibration isolating apparatus includes a hollow member of a resilient material which is filled with a liquid in such a manner as to enable it to be employed as a liquid chamber and which is partitioned into small liquid chambers through a limiting passage. This type of vibration isolating apparatus is arranged such that the liquid is caused to move between the two liquid chambers by the vibration acting on one of the chambers, whereby the vibration is absorbed by means of the fluid resistance of the liquid passing through the limiting passage.

The conventional vibration isolating apparatus of this type, however, suffers from the following problem. Namely, high-frequency vibrations easily cause the limiting passage to be clogged with the liquid, thus causing the dynamic scale factor to be undesirably increased, which fact involves a disadvantageously low capacity to absorb high-frequency vibrations. For this reason, employment of this type of vibration isolating apparatus as an engine mount may cause an occupant of the car in which it is employed to feel uncomfortable.

In order to overcome the above-described problem, a vibration isolating apparatus has heretofore been proposed in which the partition wall which divides the liquid chamber is provided with a vibrating plate which is capable of vibrating with very small amplitudes. In this conventional apparatus, the volume of each of the liquid chambers is variable by virtue of the action of the vibrating plate. Therefore, even after the limiting passage has been clogged at the time of generation of high-frequency vibrations, the dynamic to static ratio is favorably lowered due to the fact that the volume of the liquid chambers is conveniently varied by means of the vibrating plate.

However, even the apparatus having such a vibrating plate involves the disadvantage that, when a vibration of relatively large amplitude occurs, the dynamic to static ratio is increased and this causes the vibration absorbing characteristic to be undesirably lowered.

SUMMARY OF THE INVENTION

In view of the above-described circumstances, it is a primary object of the present invention to provide a vibration isolating apparatus in which the dynamic to static ratio is not increased when a low-frequency vibration of relatively large amplitude occurs even if the apparatus has a limiting passage such as that described above.

To this end, the invention provides a vibration isolating apparatus in which small liquid chambers are communicated with each other through a limiting passage, thereby absorbing low-frequency vibrations. Further, a resilient partition member is employed to divide the liquid chamber. Thus, even when the limiting passage is clogged, the change in volume of one of the small liquid chamber by the rise in the internal pressure of the chamber is minimized, and the dynamic to static ratio is thereby lowered.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
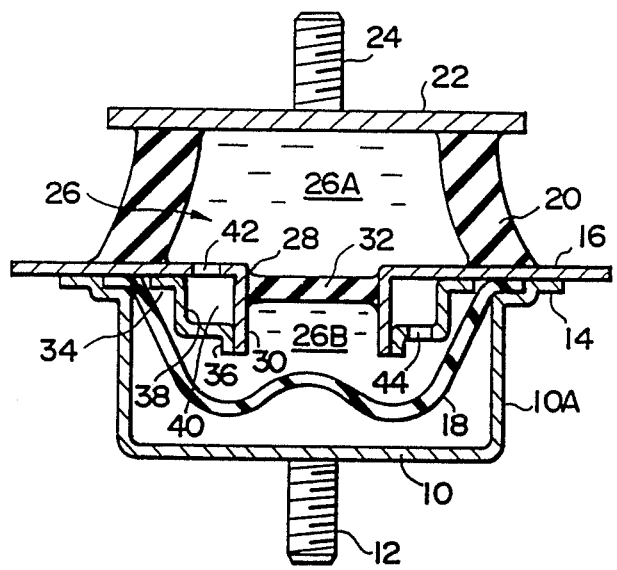
FIG. 1 is a sectional view of a first embodiment of the vibration isolating apparatus according to the present invention.

FIG. 1 shows a vibration isolating apparatus in accordance with a first embodiment of the present invention. In this embodiment, the apparatus is applied to a mount for an automotive engine.

A base plate 10 which constitutes a part of a vibration isolating apparatus body has a bolt 12 secured to the center of its lower side so that the base plate 10 is secured to the body of an automobile (not shown) through the bolt 12. A tubular portion 10A projects upwardly from the periphery of the base plate 10. A flange 14 is integrally formed at the upper end of the tubular portion 10A. A partition plate 16 is secured to the flange 14. The periphery of a diaphragm 18 is fixedly clamped between the partition plate 16 and the flange 14. Thus, an air chamber is defined by the space between the diaphragm 18 and the base plate 10.

The lower end of a cylindrical rubber member 20 which constitutes a vibration absorbing main body is bonded to the upper side of the partition plate 16 by means of vulcanization. A top plate 22 is bonded to the upper end of the rubber member 20 by means of vulcanization. A bolt 24 which projects upwardly from the upper surface of the top plate 22 is employed to secure the apparatus on an engine (not shown).

The hollow portion which is defined between the top plate 22, the rubber member 20 and the diaphragm 18 is filled with a liquid, thus constituting a liquid chamber 26.

Figure 2:
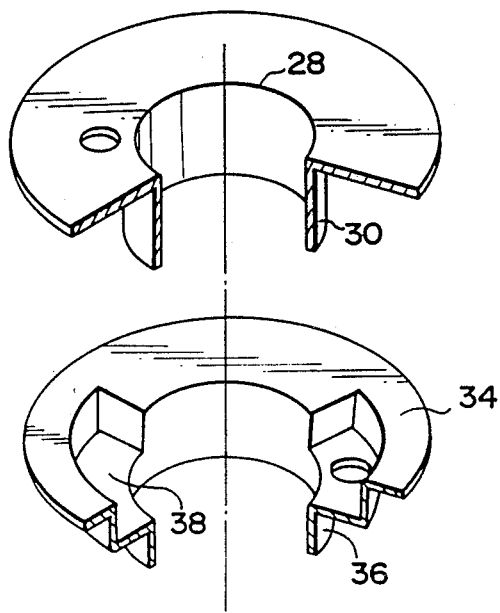
FIG. 2 is an exploded perspective view of an element for forming the orifice which is shown in FIG. 1.

As also shown in FIG. 2, the partition plate 16 has a circular bore 28 formed in its center. The upper end of a sleeve 30 is integrally connected to the periphery of the bore 28. The outer peripheral portion of a resilient partition member 32 is bonded to the inner peripheral portion of the sleeve 30 by means of vulcanization. The partition member 32 has a disk-like shape and is preferably formed of a resilient material which is deflectable by a predetermined degree, such as rubber.

Thus, the partition plate 16 and the resilient partition member 32 in combination divide the liquid chamber 26 into upper and lower liquid chambers 26A and 26B.

An abutment plate 34 is secured to the lower side of the partition plate 16. A tubular sleeve 36 projects from the inner peripheral portion of the abutment plate 34 and is secured to the outer periphery of the sleeve 30. A recess 38 with a rectangular cross-section is formed at the joint between the abutment plate 34 and the sleeve 36 in such a manner as to extend over about two thirds of the entire circumference of the sleeve 36. Thus, an orifice 40 which serves as a limiting passage is defined between the partition plate 16, the sleeve 30, the abutment plate 34 and the sleeve 36. One end of the orifice 40 is communicated with the upper liquid chamber 26A through a circular bore 42 which is formed in the partition plate 16, while the other end of the orifice 40 is communicated with the lower liquid chamber 26B through a circular bore 44 which is formed in the bottom of the recess 38.

The following is a description of the operation of this embodiment.

The base plate 10 is secured to the body of an automobile (not shown) through the bolt 12, while the engine (not shown) is mounted on the top plate 22 and secured thereto by means of the bolt 24, thus completing the assembly.

Engine vibrations are absorbed by virtue of the internal friction occurring between the rubber member 20 and the liquid sealed therein. When the frequency of vibrations is relatively low, the vibrations are absorbed by virtue of the fluid resistance of the liquid circulating between the upper and lower liquid chambers 26A and 26B through the orifice 40.

On the other hand, when the frequency of vibrations is relatively high, the orifice 40 may be clogged with the liquid. In such a case, however, the resilient partition member 32 favorably deflects by a given degree in such a manner as to move toward either of the upper and lower liquid chambers 26A, 26B and hence absorbs a rise in the internal pressure thereof. Thus, it is possible for high-frequency vibrations to be absorbed.

Figure 8:
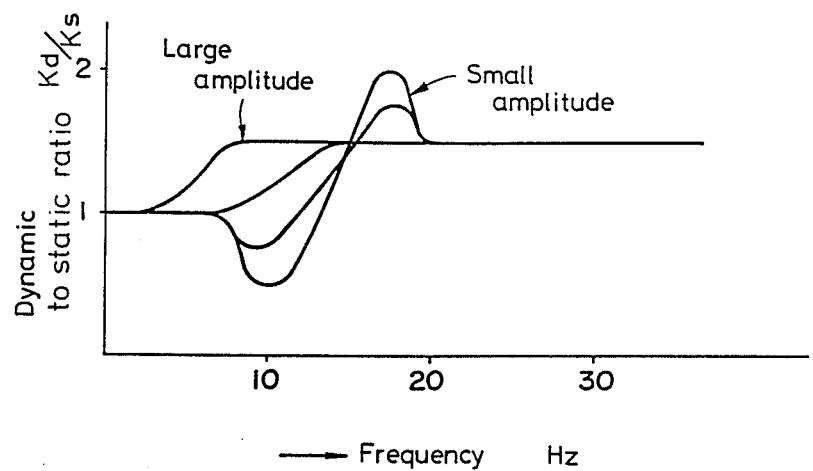
FIG. 8 is a graph representing the relationship between the dynamic to static ratio and the frequency, which shows the result of the experiment carried out on the first embodiment.

Since the resilient partition member 32 is employed in this embodiment, it is particularly possible to minimize the volume elasticity of the upper liquid chamber 26A (the volume elasticity being represented by the reciprocal of the volume of the upper liquid chamber 26A which changes when the internal pressure of the chamber 26A is raised by a unit pressure) after the orifice 40 has been clogged with the liquid. Even for vibrations of relatively large amplitude, it is possible for the dynamic to static ratio to be lowered below 2, as shown in FIG. 8.

Figure 3:
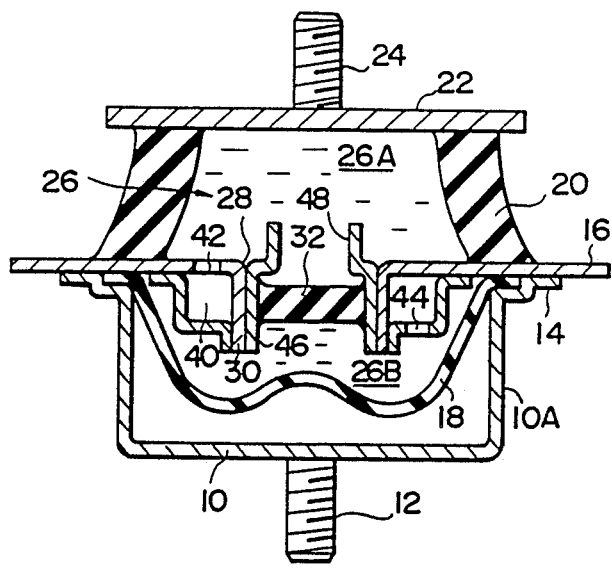
FIG. 3 is a sectional view of a second embodiment of the present invention.

Referring next to FIG. 3, there is shown a vibration isolating apparatus in accordance with a second embodiment of the present invention.

In this embodiment, a sleeve 46 is secured to the inner periphery of the sleeve 30, and the outer periphery of the resilient partition member 32 is bonded to the inner periphery o the sleeve 46 by means of vulcanization. The upper portion of the sleeve 46 is so shaped as to provide a second orifice 48 which has a reduced inner diameter. The cross-sectional opening area of the second orifice 48 is made smaller than the effective area of the partition member 32 at the opening 28 (which is determined by the inner diameter of the sleeve 46 in this embodiment) but larger than the cross-sectional opening area of the orifice 40.

Figure 9:
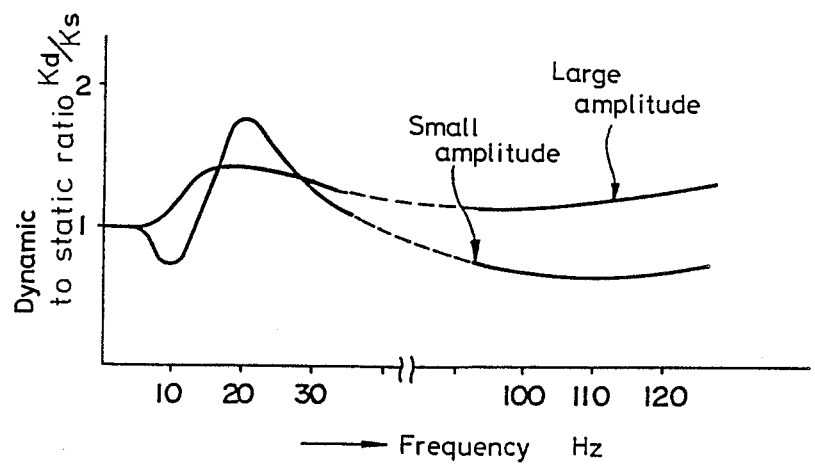
FIG. 9 is a graph representing the relationship between the dynamic to static ratio and the frequency, which shows the result of the experiment carried out on the second embodiment.

Accordingly, in this embodiment the second orifice 48 acts to absorb vibrations when the liquid within the liquid chamber 26 passes therethrough even when the orifice 40 is clogged with the liquid at the time of generation of high-frequency vibrations. It is therefore possible for the dynamic to static ratio to be lowered, particularly when high-frequency vibrations take place, as shown in FIG. 9. At the time of generation of vibrations of relatively small amplitude, the dynamic to static ratio can be lowered below 1.

Figure 4:
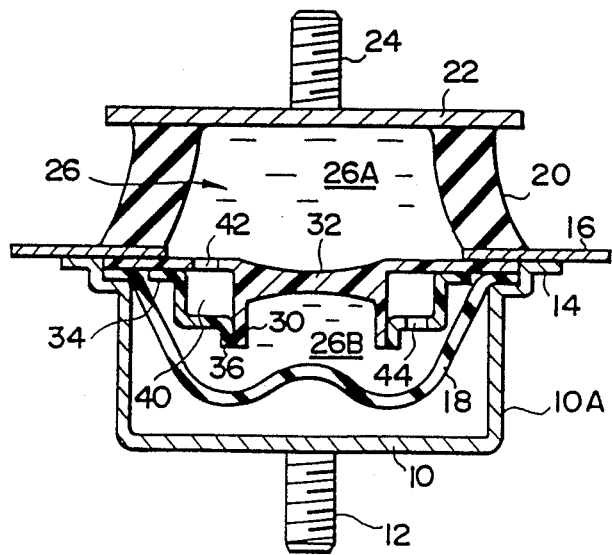
FIG. 4 is a sectional view of a third embodiment of the present invention.

FIG. 4 shows a vibration isolating apparatus in accordance with a third embodiment of the present invention.

In this embodiment, the partition plate 16, the sleeve 30, the abutment plate 34 and the sleeve 36 of the first embodiment are integrally molded of a resilient material, together with the resilient partition member 32. It is possible according to this embodiment to obtain advantageous effects which are similar to those offered by the first embodiment.

Figure 5:
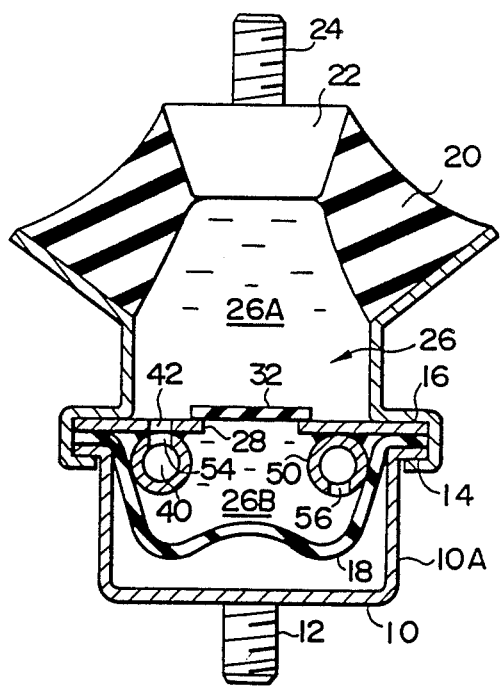
FIG. 5 is a sectional view of a fourth embodiment of the present invention.

Referring next to FIG. 5, there is shown a vibration isolating apparatus in accordance with a fourth embodiment of the present invention.

Figure 6:
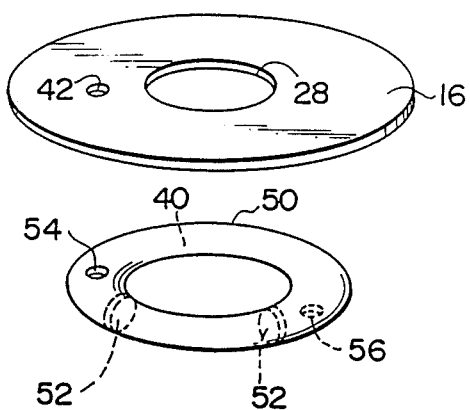
FIG. 6 is an exploded perspective view of an element for forming the orifice which is shown in FIG. 5.

In this embodiment, a tubing 50 is welded to the lower side of the partition plate 16 in such a manner that the inner periphery of the tubing 50 defines the orifice 40, as also shown in FIG. 6. For this purpose, the tubing 50 is bent in such a manner that its axis forms a ring shape. In addition, both end portions of the tubing 50 are closed by shut-off plates 52. A circular bore 54 is formed in the tubing 50 in the vicinity of one end thereof and is communicated with the circular bore 42 of the partition plate 16, and another circular bore 56 is formed in the tubing 50 in the vicinity of the other end thereof and is communicated with the lower liquid chamber 26B. The resilient partition member 32 is bonded to the peripheral edge portion of the circular bore 28 of the partition plate 16 by means of vulcanization.

In consequence, the tubing 50 in this embodiment enables the inner diameter of the orifice 40 to be increased as compared with the conventional arrangement, so that it is possible for the dynamic to static ratio to be lowered at the time of generation of low-frequency vibrations.

Figure 7:
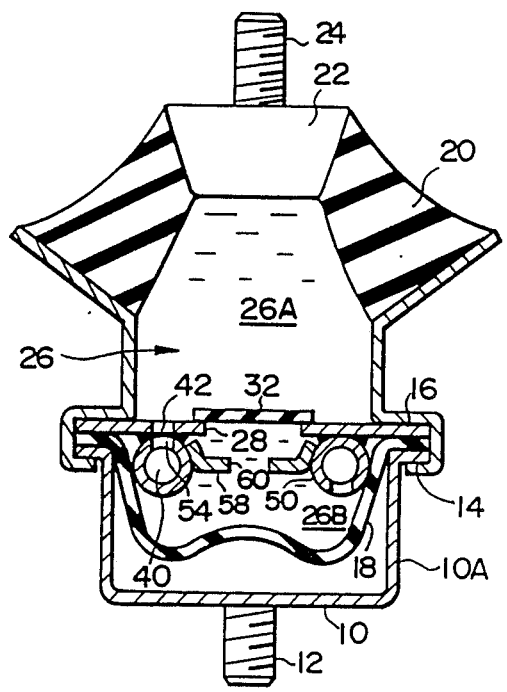
FIG. 7 is a sectional view of a fifth embodiment of the present invention.

FIG. 7 shows a vibration isolating apparatus in accordance with a fifth embodiment of the present invention.

In this embodiment, the outer peripheral portion of a disk 58 is secured to the inner periphery of the tubing 50 which is employed in the above-described embodiment, and a circular bore 60 which is formed in the vicinity of the axial center of the disk 58 constitutes a second orifice. Accordingly, the cross-sectional area of the bore 60 is larger than that of the tubing 50 but smaller than the effective area of the resilient partition member 32 at the opening 28.

Figure 10:
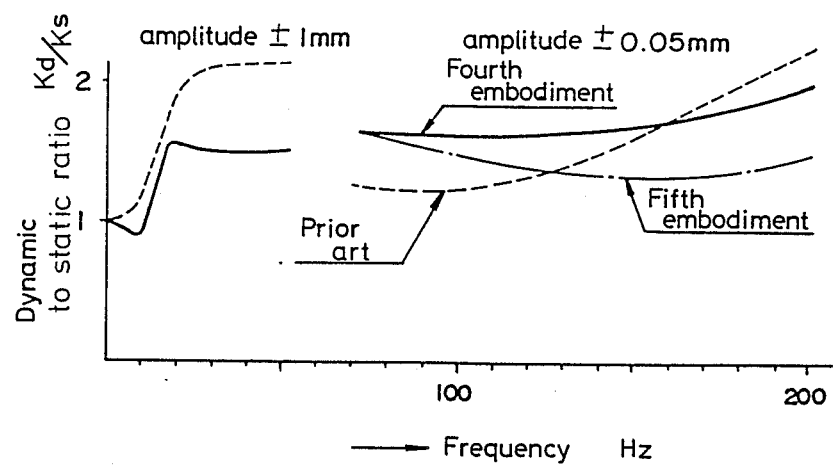
FIG. 10 is a graph representing the relationship between the dynamic to static ratio and the frequency, which shows the comparison between the fourth and fifth embodiments and the prior art.

FIG. 10 is a graph representing the relationship between the dynamic to static ratio and the frequency, which shows the comparison between the vibration isolating apparatuses in accordance with the fourth and fifth embodiments and the conventional vibration isolating apparatus in which a vibrating plate is provided on its partition wall portion. In this case, the tubing 50 of the fourth embodiment shown in FIG. 5 has an inner diameter of 10 mm and an effective length of 130 mm, while its resilient partition member 32 has a wall thickness of 5 mm and an effective opening area of 40 mm. In regard to the fifth embodiment shown in FIG. 7, the tubing 50 has an inner diameter of 10 mm and an effective length of 110 mm; the resilient partition member 32 has a wall thickness of 5 mm and an effective opening area of 40 mm; the disk 58 has a wall thickness of 1.5 mm; the circular bore 60 has a diameter of 26 mm; and the distance between the disk 58 and the resilient partition member 32 is 3 mm.

The loss factor tan$\delta$ at a frequency of 10 Hz was 0.46 for the prior art, 0.45 for the fourth embodiment, and 0.47 for the fifth embodiment, while the dynamic to static ratio at a frequency of 100 Hz was 1.35 for the prior art, 1.55 for the fourth embodiment, and 1.45 for the fifth embodiment.

In the graph of FIG. 10, the lowering of the dynamic to static ratio at various frequency ranges is attained by virtue of the following factors: namely, the lowering of the dynamic to static ratio at frequencies below 20 Hz is mainly due to the fact that the inner diameter of the tubing 50 is relatively large; that at frequencies from 20 to 50 Hz is mainly due to the provision of the resilient partition member 32; and that at frequencies above 70 Hz is mainly due to the existence of the second orifice 48 or 60.

Figure 11:
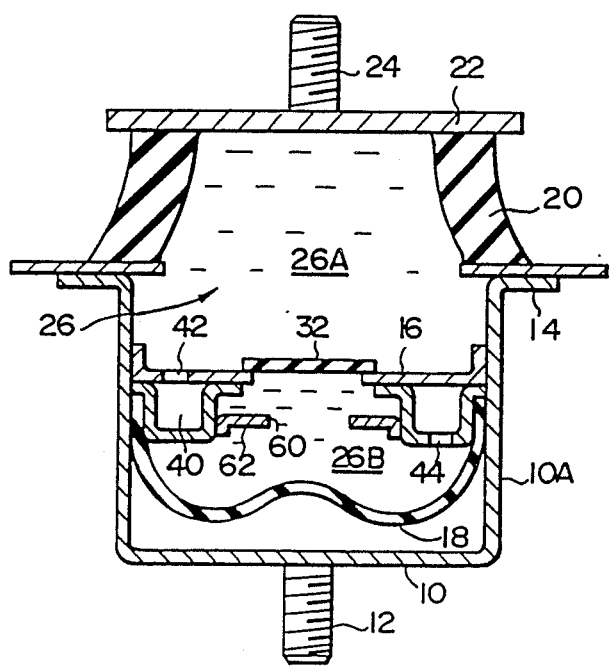
FIG. 11 is a sectional view of a sixth embodiment of the present invention.

Referring next to FIG. 11, there is shown a vibration isolating apparatus in accordance with a sixth embodiment of the present invention.

In this embodiment, a disk 62 is provided in the lower liquid chamber 26B in the arrangement according to the first embodiment shown in FIG. 1, whereby the sixth embodiment offers advantageous effects similar to those of the fifth embodiment which is shown in FIG. 7.

Figure 12:
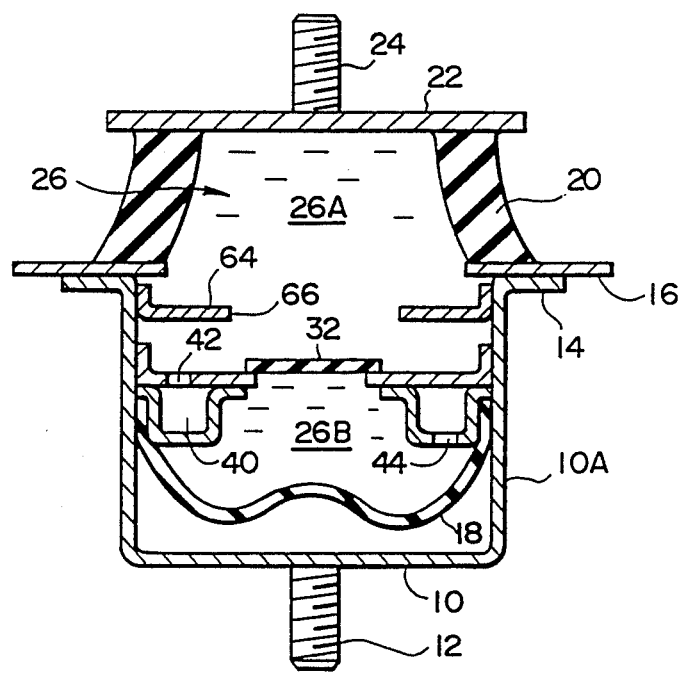
FIG. 12 is a sectional view of a seventh embodiment of the present invention.

On the other hand, in a seventh embodiment shown in FIG. 12, a disk 64 is secured to the inner periphery of the tubular portion 10A within the upper liquid chamber 26A, the disk 64 partitioning the upper liquid chamber 26A, and a circular bore 66 which is formed in the center of the disk 64 defines an orifice, thus offering advantageous effects which are similar to those offered by the second embodiment shown in FIG. 3.

It is necessary for each of the disks 62 and 64 respectively employed in the sixth and seventh embodiments to be spaced from the corresponding resilient partition member 32 by 0.5 mm or more.

Although these embodiments exemplify an arrangement in which a single bore is formed in the axial center of the disk which is employed to form a second orifice, the present invention is not necessarily limited to the above-described arrangement, and it is also possible to obtain advantageous effects equivalent to those offered by the embodiments by forming a plurality of small bores in the disk. In such a case, the effective cross-sectional opening area of the second orifice thus formed is the sum total of the cross-sectional areas of the small bores.

As has been described above, the vibration isolating apparatus according to the present invention is arranged such that a liquid chamber is divided by a partition member into a plurality of small liquid chambers which are communicated with each other through a limiting passage, and a resilient member is provided on the partition member. It is therefore advantageously possible to lower the dynamic to static ratio at the time of generation of vibrations of relatively large amplitude.

What is claimed is:

1. A vibration isolating apparatus disposed between a vibration generating portion and a vibration receiving portion and having a liquid chamber capable of being expanded and contracted, which apparatus comprises a partition member, made of a stretchable resilient material and having a substantially uniform thickness, which divides said liquid chamber into two small liquid chambers and which is disposed so as to be deformable to the maximum deformation limit of the resilient material in response to vibration amplitudes, and an orifice disposed between said small liquid chambers to communicate through small openings therebetween, whereby low-frequency vibrations are absorbed by virtue of fluid resistance occurring in said orifice, while high-frequency, vibrations are absorbed by virtue of deformation of said resilient partition member which suppresses rises in pressure inside said liquid chamber.

2. A vibration isolating apparatus according to claim 1, wherein said resilient partition member comprises a plate-like stretchable flat rubber membrane with uniform thickness.

3. A vibration isolating apparatus according to claim 1, wherein said lower small liquid chamber is defined by a diaphragm to deform by pressure.

4. A vibration isolating apparatus according to claim 3, wherein said partition wall member is formed with a tubular portion, and said rubber membrane is secured to the inner periphery of said tubular portion.

5. A vibration isolating apparatus according to claim 4, wherein said orifice is disposed in such a manner as to surround said tubular portion.

6. A vibration isolating apparatus according to claim 5, wherein said orifice is defined between said partition wall member and a plate member disposed so as to abut against said partition wall member.

7. A vibration isolating apparatus according to claim 6, wherein said partition wall member and said resilient partition member are integrally formed of a resilient material.

8. A vibration isolating apparatus according to claim 5, wherein said orifice is defined by the inner periphery of a looped tubing.

9. A vibration isolating apparatus according to claim 1, further comprising opening means provided in any one of said small liquid chambers, said opening means having a cross-sectional opening area which is larger than that of said orifice but smaller than an effective cross-sectional opening area of said resilient partition member, whereby the high-frequency vibration absorbing; effect is enhanced.

10. A vibration isolating apparatus according to claim 9, wherein said opening means is integrally formed with a tubular member which supports the periphery of said resilient partition member.

11. A vibration isolating apparatus according to claim 10, wherein said opening means is disposed coaxially with said resilient partition member.

12. A vibration isolating apparatus according to claim 9, wherein said opening means is constituted by a portion of a tubular member or sleeve which has a reduced cross-sectional opening area.

13. A vibration isolating apparatus according to claim 9, wherein said opening means is constituted by a through-hole formed in a partition plate employed for partitioning said liquid chamber.

14. A vibration isolating apparatus according to claim 9, wherein said opening means is formed in a plate member disposed in at least one of said small liquid chambers.

15. A vibration isolating apparatus disposed between a vibration generating portion and a vibration receiving portion, which comprises:
   (a) a main body having a portion thereof constituted by a resilient member, said main body having a liquid chamber capable of being expanded and contracted;
   (b) a partition wall member which divides said liquid chamber into a plurality of small liquid chambers;
   (c) an orifice which provides communication between said liquid chambers through a small cross-sectional opening area, thereby absorbing low-frequency vibrations;
   (d) a partition member, made of a stretchable resilient material and having a substantially uniform thickness, disposed in at least a portion of said partition wall member so as to be deformable to the maximum deformation limit of the resilient material in response to vibration amplitudes, thereby absorbing high-frequency vibrations; and
   (e) opening means provided in any one of said small liquid chambers, said opening means having a cross-sectional opening area which is larger than that of said orifice but smaller than an effective cross-sectional opening area of said resilient partition member, whereby high-frequency vibration absorbing effect is enhanced.

16. A vibration isolating apparatus according to claim 15, wherein said opening means is integrally formed with a tubular member which supports the periphery of said resilient partition member.

17. A vibration isolating apparatus according to claim 16, wherein said opening means is disposed coaxially with said resilient partition member.

18. A vibration isolating apparatus according to claim 15, wherein said opening means is constituted by a portion of a tubular member which has a reduced cross-sectional opening area.

19. A vibration isolating apparatus according to claim 15, wherein said opening means is constituted by a through-hole formed in a partition plate employed for partitioning said liquid chamber.

20. A vibration isolating apparatus according to claim 15, wherein said opening means is formed in a plate member disposed in at least one of said small liquid chambers.

21. A vibration isolating apparatus interposed between a vibration generating portion and a vibration receiving portion, which comprises:
   (a) a base plate secured to either one of said vibration generating and receiving portions;
   (b) a top plate secured to the other of said vibration generating and receiving portions;
   (c) a vibration absorbing main body disposed between said base and top plates and having its inside employed as a liquid chamber which is capable of being expanded and contracted;
   (d) a partition wall member secured to said vibration absorbing main body to divide said liquid chamber into a pair of small liquid chambers;
   (e) a low-frequency vibration absorbing orifice which provides communication between said pair of small liquid chambers; and
   (f) a membrane, made of a stretchable resilient material and having a substantially uniform thickness, which constitutes at least a portion of said partition wall member and which is deformable to the maximum deformation limit of the resilient material in response to vibration amplitudes, so that rises in pressure inside said small liquid chambers are prevented by virtue of deformation of said resilient membrane, thereby allowing high-frequency vibrations to be absorbed.

22. A vibration isolating apparatus according to claim 21, wherein said orifice is disposed in such a manner as to surround a tubular portion of said partition wall member.

23. A vibration isolating apparatus according to claim 21, wherein said partition wall member and said resilient membrane are integrally formed of a resilient material.

24. A vibration isolating apparatus according to claim 21, further comprising opening means provided in either one of said small liquid chambers, said opening means having a cross-sectional opening area which is larger than that of said orifice but smaller than an effective cross-sectional opening area of said resilient membrane, whereby high-frequency vibration absorbing effect is enhanced.

25. A vibration isolating apparatus according to claim 24, wherein said opening means is integrally formed with a tubular member which supports the periphery of said resilient membrane.

26. A vibration isolating apparatus according to claim 25, wherein said opening means is disposed coaxially with said resilient membrane.

27. A vibration isolating apparatus according to claim 24, wherein said opening means is constituted by a portion of a tubular member which has a reduced cross-sectional opening area.

28. A vibration isolating apparatus according to claim 24, wherein said opening means is formed in a plate member disposed in at least one of said small liquid chambers.

* * * * *